US010680893B2

(12) United States Patent
Uchizumi et al.

(10) Patent No.: US 10,680,893 B2
(45) Date of Patent: Jun. 9, 2020

(54) COMMUNICATION DEVICE, SYSTEM, AND METHOD

(71) Applicant: ALAXALA Networks Corporation, Kawasaki-shi, Kanagawa (JP)

(72) Inventors: Keigo Uchizumi, Kawasaki (JP); Hiroki Yano, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 90 days.

(21) Appl. No.: 15/751,548

(22) PCT Filed: Feb. 12, 2016

(86) PCT No.: PCT/JP2016/054048
§ 371 (c)(1),
(2) Date: Feb. 9, 2018

(87) PCT Pub. No.: WO2017/073089
PCT Pub. Date: May 4, 2017

(65) Prior Publication Data
US 2019/0190777 A1    Jun. 20, 2019

(30) Foreign Application Priority Data

Oct. 27, 2015 (JP) ................................. 2015-210495

(51) Int. Cl.
*H04L 12/24* (2006.01)
*H04L 12/66* (2006.01)
(Continued)

(52) U.S. Cl.
CPC ............ *H04L 41/085* (2013.01); *H04L 12/66* (2013.01); *H04L 41/0873* (2013.01);
(Continued)

(58) Field of Classification Search
CPC ..................................................... H04L 41/085
(Continued)

(56) References Cited

U.S. PATENT DOCUMENTS 8,572,266 B2 * 10/2013 Larocca .................. H04M 1/67
709/227
8,695,100 B1 *  4/2014 Cosoi ..................... G06F 21/554
713/187

(Continued)

FOREIGN PATENT DOCUMENTS

JP        2009-239525 A    10/2009
JP        2015-050767 A     3/2015

OTHER PUBLICATIONS

Technopedia, "network redundancy", 2019 (Year: 2019).*
(Continued)

*Primary Examiner* — Ondrej C Vostal
(74) *Attorney, Agent, or Firm* — Mattingly & Malur, PC

(57) ABSTRACT

It is an object of the present invention to achieve improvement of security by a whitelist function and improvement of network reliability by a network redundancy function at the same time. A packet relay device 100 includes packet reception units 200, a packet transfer unit 300, a S/W control unit 400, packet transmission units 500, and an input/output interface 600 and automatically generates a whitelist including an allowed communication rule. It is possible to select whether to perform communication control using the whitelist or to carry out data communication without using the whitelist for each data reception unit 200 that receives data.

9 Claims, 15 Drawing Sheets

(51) Int. Cl.
*H04L 29/06* (2006.01)
*H04L 12/741* (2013.01)
*H04L 12/823* (2013.01)

(52) U.S. Cl.
CPC .............. *H04L 41/28* (2013.01); *H04L 45/74* (2013.01); *H04L 47/32* (2013.01); *H04L 63/00* (2013.01); *H04L 63/0227* (2013.01); *H04L 63/101* (2013.01)

(58) Field of Classification Search
USPC ........................................................ 709/223
See application file for complete search history.

(56) References Cited

U.S. PATENT DOCUMENTS

| | | | | | |
|---|---|---|---|---|---|
| 9,306,873 | B2* | 4/2016 | Beers | ..................... | H04L 49/254 |
| 9,369,434 | B2* | 6/2016 | Kim | ..................... | H04L 63/101 |
| 9,491,176 | B1* | 11/2016 | Jaini | ..................... | H04L 63/10 |
| 9,672,818 | B2* | 6/2017 | Bradford | ................. | G10L 15/18 |
| 9,961,079 | B1* | 5/2018 | Wang | .................. | H04L 63/0876 |
| 2007/0232342 | A1* | 10/2007 | Larocca | .................. | H04M 1/67 |
| | | | | | 455/518 |
| 2010/0299398 | A1* | 11/2010 | Nagoya | ............. | H04L 29/12594 |
| | | | | | 709/206 |
| 2011/0113249 | A1* | 5/2011 | Gelbard | .................. | H04L 51/12 |
| | | | | | 713/170 |
| 2011/0173264 | A1* | 7/2011 | Kelly | ..................... | G06Q 10/10 |
| | | | | | 709/205 |
| 2011/0258454 | A1* | 10/2011 | Qiu | ......................... | H04L 63/08 |
| | | | | | 713/176 |
| 2012/0331534 | A1* | 12/2012 | Smith | .................... | G06F 21/41 |
| | | | | | 726/6 |
| 2013/0074186 | A1* | 3/2013 | Muttik | .................... | G06F 21/51 |
| | | | | | 726/24 |
| 2013/0111591 | A1* | 5/2013 | Topan | ................... | G06F 21/563 |
| | | | | | 726/24 |
| 2013/0198374 | A1* | 8/2013 | Zalmanovitch | ....... | H04L 43/062 |
| | | | | | 709/224 |
| 2014/0233585 | A1* | 8/2014 | Beers | .................... | H04L 49/254 |
| | | | | | 370/431 |
| 2014/0313975 | A1* | 10/2014 | Berenberg | ............ | H04W 12/08 |
| | | | | | 370/328 |
| 2015/0067764 | A1* | 3/2015 | Kim | .................... | H04L 63/0227 |
| | | | | | 726/1 |
| 2015/0281244 | A1* | 10/2015 | Wen | .................... | H04L 63/1483 |
| | | | | | 726/1 |

OTHER PUBLICATIONS

"Alaxala Ring Usage Guide", 1.3 Glossary, Sep. 24, 2008 (https://www.alaxala.com/jp/techinfo/archive/guide/pdf/N08R038_Ring_U-Guide_V1R0.pdf).

"AX7800S/AX5400S Software Manual Configuration Guide vol. 1", 8.1.3 Components of Spanning Tree Topology ((1) Root Bridge/Designated Bridge, (2) Root Port/Designated Port), 8.5.1 Edge Port, Mar. 18, 2014 (https://www.alaxala.com/jp/techinfo/archive/manual/AX5400S/HTML/10_10_APGUIDE/0001.HTM).

International Search Report of PCT/JP2016/054048 dated Apr. 12, 2016.

\* cited by examiner

FIG. 3

| HELD INFORMATION 501 | HELD CONTENT 502 | INITIAL STATE 503 | |
|---|---|---|---|
| WHITELIST FUNCTION | WHITELIST SWITCH MODE/ NORMAL SWITCH MODE | NORMAL SWITCH MODE | 504 |
| WHITELIST FUNCTION STATE | GENERATION STATE/ PRACTICAL STATE | PRACTICAL STATE | 505 |
| OPERATION AT TIME OF RECEIVING PACKET NOT REGISTERED IN WHITELIST | DISCARD/PASS | PASS | 506 |
| SETTING FOR EXCLUDING PACKET RECEPTION UNIT FROM WHITELIST TARGET | PACKET RECEPTION UNIT #1 TARGET/EXCLUDED FROM TARGET<br>PACKET RECEPTION UNIT #2 TARGET/EXCLUDED FROM TARGET<br>. . . . .<br>PACKET RECEPTION UNIT #n TARGET/EXCLUDED FROM TARGET | ALL PACKET RECEPTION UNITS ASSIGNED AS TARGET | 507 |
| SETTING FOR CLOSING PACKET RECEPTION UNIT EXCLUDED FROM WHITELIST TARGET AT TIME OF LINK DOWN | TO BE CLOSED/ NOT TO BE CLOSED | ALL PACKET RECEPTION UNITS ASSIGNED NOT TO BE CLOSED | 508 |

FIG. 4

| COMMAND CLASS | SETTING CONTENT | INITIAL STATE | |
|---|---|---|---|
| WHITELIST FUNCTION SETTING | WHITELIST SWITCH MODE/<br>NORMAL SWITCH MODE | NORMAL<br>SWITCH MODE | 1104 |
| WHITELIST FUNCTION STATE SETTING | GENERATION STATE/<br>PRACTICAL STATE | PRACTICAL STATE | 1105 |
| OPERATION SETTING AT TIME OF<br>RECEIVING PACKET<br>NOT REGISTERED IN WHITELIST | DISCARD/PASS | PASS | 1106 |
| SETTING FOR EXCLUDING PACKET<br>RECEPTION UNIT<br>FROM WHITELIST TARGET | PACKET RECEPTION UNIT #1  TARGET/EXCLUDED FROM TARGET<br>PACKET RECEPTION UNIT #2  TARGET/EXCLUDED FROM TARGET<br>· · · · ·<br>PACKET RECEPTION UNIT #n  TARGET/EXCLUDED FROM TARGET | ALL PACKET<br>RECEPTION UNITS<br>ASSIGNED<br>AS TARGET | 1107 |
| SETTING FOR CLOSING PACKET<br>RECEPTION UNIT EXCLUDED<br>FROM WHITELIST TARGET<br>AT TIME OF LINK DOWN | TO BE CLOSED/<br>NOT TO BE CLOSED | ALL PACKET<br>RECEPTION UNITS<br>ASSIGNED NOT<br>TO BE CLOSED | 1108 |

| PACKET TRANSMISSION/<br>RECEPTION UNIT NUMBER | TRANSMISSION<br>SOURCE |
|---|---|
| 121 | A |

| PACKET TRANSMISSION/<br>RECEPTION UNIT NUMBER | TRANSMISSION<br>SOURCE |
|---|---|
| 133 | A |

| PACKET TRANSMISSION/<br>RECEPTION UNIT NUMBER | TRANSMISSION<br>SOURCE |
|---|---|
| 125 | A |

| PACKET TRANSMISSION/<br>RECEPTION UNIT NUMBER | TRANSMISSION<br>SOURCE |
|---|---|
| 127 | A |

| PACKET TRANSMISSION/<br>RECEPTION UNIT NUMBER | TRANSMISSION<br>SOURCE |
|---|---|
| 122 | A |

| PACKET TRANSMISSION/<br>RECEPTION UNIT NUMBER | TRANSMISSION<br>SOURCE |
|---|---|
| 133 | A |

| PACKET TRANSMISSION/<br>RECEPTION UNIT NUMBER | TRANSMISSION<br>SOURCE |
|---|---|
|  |  |

| PACKET TRANSMISSION/<br>RECEPTION UNIT NUMBER | TRANSMISSION<br>SOURCE |
|---|---|
|  |  |

| HELD INFORMATION 1801 | HELD CONTENT 1802 | INITIAL STATE 1803 | |
|---|---|---|---|
| WHITELIST FUNCTION | WHITELIST SWITCH MODE/ NORMAL SWITCH MODE | NORMAL SWITCH MODE | 1804 |
| WHITELIST FUNCTION STATE | GENERATION STATE/ PRACTICAL STATE | PRACTICAL STATE | 1805 |
| OPERATION AT TIME OF RECEIVING PACKET NOT REGISTERED IN WHITELIST | DISCARD/PASS | PASS | 1806 |
| WHITELIST REGENERATION SETTING OF PACKET RECEPTION UNIT | PACKET RECEPTION UNIT #1 REGENERATION/NON-REGENERATION<br>PACKET RECEPTION UNIT #2 REGENERATION/NON-REGENERATION<br>.....<br>PACKET RECEPTION UNIT #n REGENERATION/NON-REGENERATION | ALL PACKET RECEPTION UNITS ASSIGNED AS NON-REGENERATION | 1807 |
| SETTING FOR CLOSING PACKET RECEPTION UNIT IN WHITELIST REGENERATION STATE AT TIME OF LINK DOWN | TO BE CLOSED/ NOT TO BE CLOSED | ALL PACKET RECEPTION UNITS ASSIGNED NOT TO BE CLOSED | 1808 |
| WHITELIST REGENERATION STATE SETTING | REGENERATION STATE/PRACTICAL STATE | PRACTICAL STATE | 1809 |

FIG. 11

| COMMAND CLASS (1901) | SETTING CONTENT (1902) | INITIAL STATE (1903) | |
|---|---|---|---|
| WHITELIST FUNCTION SETTING | WHITELIST SWITCH MODE/ NORMAL SWITCH MODE | NORMAL SWITCH MODE | 1904 |
| WHITELIST FUNCTION STATE SETTING | GENERATION STATE/ PRACTICAL STATE | PRACTICAL STATE | 1905 |
| OPERATION SETTING AT TIME OF RECEIVING PACKET NOT REGISTERED IN WHITELIST | DISCARD/PASS | PASS | 1906 |
| WHITELIST REGENERATION SETTING OF PACKET RECEPTION UNIT | PACKET RECEPTION UNIT #1  REGENERATION/NON-REGENERATION<br>PACKET RECEPTION UNIT #2  REGENERATION/NON-REGENERATION<br>. . . . .<br>PACKET RECEPTION UNIT #n  REGENERATION/NON-REGENERATION | ALL PACKET RECEPTION UNITS ASSIGNED AS NON-REGENERATION | 1907 |
| SETTING FOR CLOSING PACKET RECEPTION UNIT IN WHITELIST REGENERATION STATE AT TIME OF LINK DOWN | TO BE CLOSED/ NOT TO BE CLOSED | ALL PACKET RECEPTION UNITS ASSIGNED NOT TO BE CLOSED | 1908 |
| WHITELIST REGENERATION STATE SETTING | REGENERATION STATE/PRACTICAL STATE | PRACTICAL STATE | 1909 |

COMMUNICATION DEVICE, SYSTEM, AND METHOD

TECHNICAL FIELD

The present invention relates to a communication device, a system, and a method.

BACKGROUND ART

In recent years, it is necessary to take measures to prevent attackers from intruding into networks in critical infrastructures such as power plants and depriving control of a system. In a network of a critical infrastructure, defense measures by a firewall device, virus software installed in a terminal such as a personal computer, and the like are carried out. However, in order to prevent the intrusion of attackers trying to deprive system control, more intensified measures are required. There is a method of using a whitelist function as a technique to reduce the risk of intrusion by an attacker. The whitelist function is a function to register legitimate terminal information included in in-legitimate communication information flowing in a network to a whitelist accommodating device and block non-legitimate communication from terminals other than legitimate terminals registered in the whitelist accommodating device, thereby enhancing the security level.

As background fields of the present technology, there are JP 2015-050767 A (PTL 1) and JP 2009-239525 A (PTL 2).

PTL 1 discloses that "a network switch includes: a whitelist monitoring unit in which a whitelist including an allowed communication rule is retained in advance, the whitelist monitoring unit monitoring one or more packets input via a plurality of switch interfaces on the basis of the whitelist and allowing communication for a packet conforming to the whitelist; and a whitelist management unit that updates the whitelist to send to the whitelist monitoring unit" (refer to the abstract).

PTL 2 discloses that "a packet filtering device receives a packet transmitted from a session initiation protocol (SIP) server, judges whether the received packet is a response to an authentication request transmitted from a SIP client at a predetermined interval, and, when it is judged that the received packet is a response to the authentication request and transmission source information on this packet is not stored in a whitelist, acquires the transmission source information on this packet to retain in the whitelist; then, when detecting that congestion has occurred in a network, the packet filtering device receives a packet on the network, and, among the received packets, transfers a packet whose transmission source is stored in the whitelist to a transmission destination in preference to a packet whose transmission source is not stored in the whitelist" (refer to the abstract).

CITATION LIST

Patent Literature

PTL 1: JP 2015-050767 A
PTL 2: JP 2009-239525 A

Non-Patent Literature

NPL 1: "ALAXALA Ring Usage Guide", 1.3 Glossary (https://www.alaxala.com/jp/techinfo/archive/guide/pdf/N08R038_Ring_U-Guide_V1R0.pdf)

NPL 2: "AX7800S/AX5400S Software Manual Configuration Guide Vol. 1", 8.1.3 Components of Spanning Tree Topology ((1) Root Bridge/Designated Bridge, (2) Root Port/Designated Port), 8.5.1 Edge Port (https://www.alaxala.com/jp/techinfo/archive/manual/AX5400S/HTML/10_10_/APGUIDE/0001.HTM)

SUMMARY OF INVENTION

Technical Problem

In a case where a plurality of communication devices are arranged to implement route redundancy on a network and a general route redundancy protocol (for example, a ring protocol (refer to NPL 1) or a spanning tree protocol) is used in carrying out the route redundancy, when a failure occurs in any communication device or communication cable on the network and communication in the current state can no longer be continued, switching of a communication route is carried out and communication is continued.

In the technology disclosed in PTL 1, in order to halt an attack in the above-mentioned case, the network switch holds a whitelist in which an entry consisted of plural kinds of information such as the transmission source, the transmission destination, and the protocol is registered in units of interfaces included in the network switch. The information included in each entry is set beforehand for each interface. However, in order to implement the above-mentioned redundancy of the network while using the above-mentioned whitelist, the same whitelist must be duplicately registered for all interfaces having the possibility of occurrence of route switching. Even if the technology for automatically generating the whitelist disclosed in PTL 2 is used, all of the route switching patterns must be carried out beforehand, for example, by simulatively causing failures to generate the whitelist. Therefore, as the number of route switching patterns increases, the amount of memory consumption in the device also increases and there is a problem that the efforts for setting and carrying out route switching also increase.

In view of the foregoing, it is an object of the present invention to achieve improvement of security by a whitelist function and improvement of network reliability by a network redundancy function.

Solution to Problem

A first solving means of the present invention provides a communication device including:

a first reception unit that has a port connected to a redundant network or a ring port or a port having a possibility of occurrence of route switching at the time of failure and is set in advance to be excluded from a target of generation and control of a whitelist which is a list of communication data permitted to be transferred;

a second reception unit that has a port connected to another device or an edge port or a port having no probability of occurrence of route switching at the time of failure and is set in advance as a target of generation and control of the whitelist;

a transfer unit that transfers communication data to a transfer destination defined in advance when determining that the communication data has been received via the first reception unit, in a case where the communication device is set in advance to a whitelist generation state; and a control unit that generates and stores the whitelist based on communication data that has been received and causes the transfer unit to transfer the communication data to a transfer destination defined in advance when the transfer unit determines that the communication data has been received via the second reception unit, in a case where the communication device is set in advance to the whitelist generation state.

A second solving means of the present invention provides a communication system, in which the redundant network operates according to a ring protocol or a spanning tree protocol, and the communication device as described above is provided in each node of the redundant network.

A third solving means of the present invention provides a communication method including:

setting in advance a first reception unit having a port connected to a redundant network or a ring port or a port having a possibility of occurrence of route switching at the time of failure to be excluded from a target of generation and control of a whitelist which is a list of communication data permitted to be transferred;

setting in advance a second reception unit having a port connected to another device or an edge port or a port having no probability of occurrence of route switching at the time of failure as a target of generation and control of the whitelist;

transferring communication data to a transfer destination defined in advance when it is determined that the communication data has been received via the first reception unit, in a case where a communication device is set in advance to a whitelist generation state; and generating and storing the whitelist based on communication data that has been received and transferring the communication data to a transfer destination defined in advance when it is determined that the communication data has been received via the second reception unit, in a case where the communication device is set in advance to the whitelist generation state.

Advantageous Effects of Invention

According to the present invention, improvement of security can be achieved by a whitelist function and improvement of network reliability can be achieved by a network redundancy function.

BRIEF DESCRIPTION OF DRAWINGS

FIG. 3 is an example of setting information held by a transfer setting memory in the first embodiment.

FIG. 4 is an example of a list of commands transmitted from an input/output device to a packet relay device in the first embodiment.

FIG. 6A_101 to 6A_104 are examples of information saved in transfer table memories 330 of packet relay devices 101 to 104 in the first embodiment after a packet addressed to a terminal 111 is transmitted from a terminal 112 in the network in FIG. 5A. FIG. 6B_101 to 6B_104 are examples of information saved in the transfer table memories 330 of the packet relay devices 101 to 104 in the first embodiment after a packet addressed to the terminal 111 is transmitted from the terminal 112 in the network in FIG. 5B.

FIG. 10 is an example of setting information held by a transfer setting memory in a second embodiment.

FIG. 11 is an example of a list of commands transmitted from an input/output device to a packet relay device in the second embodiment.

DESCRIPTION OF EMBODIMENTS

A. Overview

Provided is a communication device capable of simultaneously using a data transmission/reception unit that carries out communication control using a whitelist and a data transmission/reception unit that carries out general communication control without using a whitelist for a plurality of data transmission/reception units included in the communication device. Further provided is a communication device having a function of automatically closing a data transmission/reception unit that does not use a whitelist when a link down occurs.

B. First Embodiment (1) Packet Relay Device (Communication Device)

Figure 1:
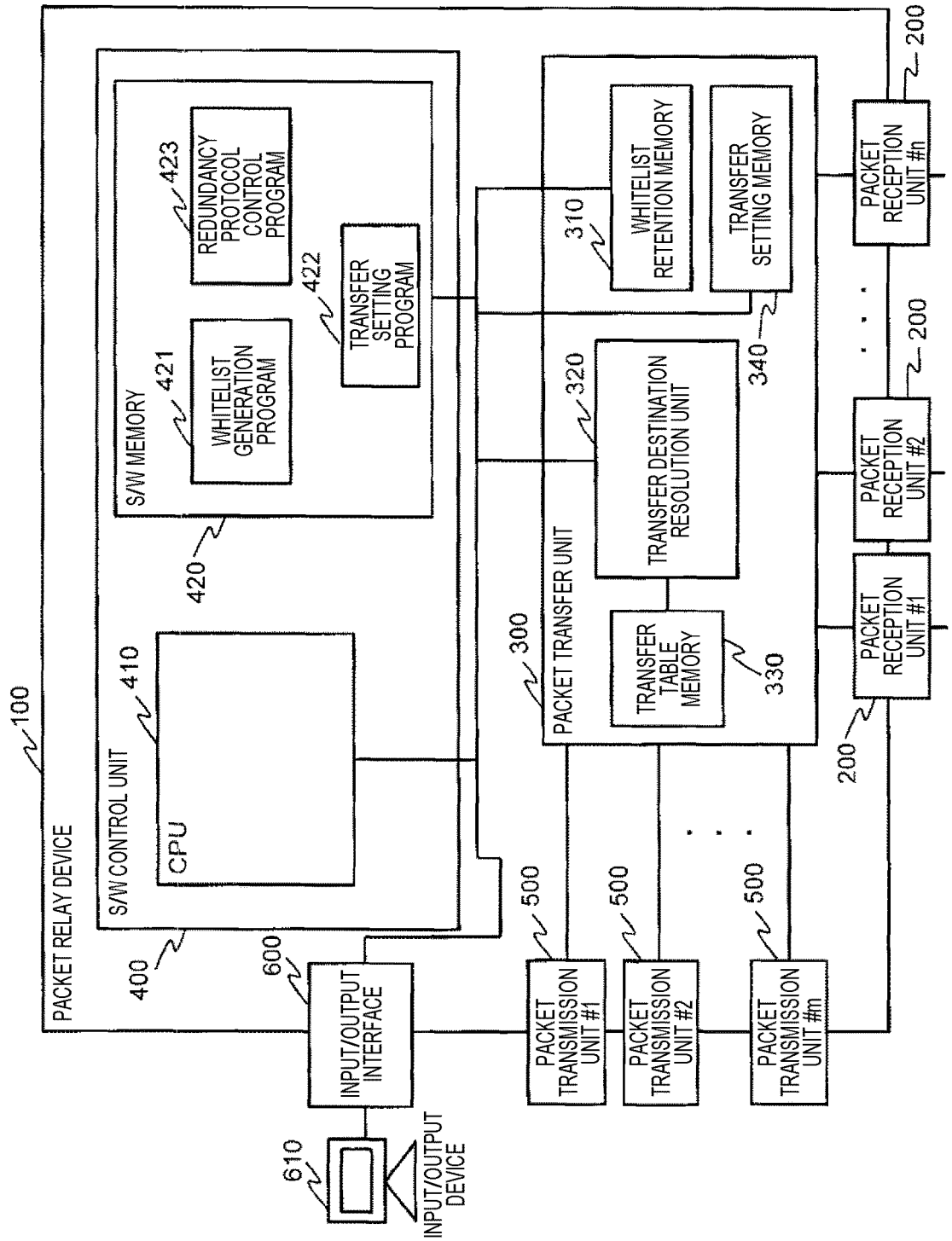
FIG. 1 is a block diagram illustrating a configuration example of a relay device for a packet in a first embodiment.

FIG. 1 illustrates a configuration example of a packet relay device that relays a packet which is an example of data. The packet relay device 100 is an example of the communication device. The packet relay device 100 relays a packet and generates a whitelist. The whitelist refers to, for example, a list of packets permitted to be transferred by the packet relay device 100.

The packet relay device 100 includes, for example, a plurality of packet reception units 200, a packet transfer unit 300, a software (S/W) control unit 400, a plurality of packet transmission units 500, and an input/output interface 600.

Each of the packet reception units 200 is, for example, connected to an external device such as a terminal or another packet relay device through a line such as a metal cable or an optical cable and receives a packet from the connected external device. Each of the packet reception units 200 has a reception unit number uniquely identifying the packet reception unit 200.

Upon receiving a packet, each of the packet reception units 200 adds, to this packet, control information (e.g., the packet reception unit and a virtual local area network (VLAN) number) corresponding to each packet reception unit 200. The control information includes information indicating a packet reception unit group having one or more packet reception units 200. Both of the packet reception unit number of the packet reception unit 200 and the VLAN number which is an identifier of a VLAN to which this packet reception unit 200 belongs are examples of the control information added by this packet reception unit 200.

The packet transfer unit 300 receives a packet from the packet reception unit 200 and, for example, transfers or discards the received packet in accordance with the whitelist generated by the S/W control unit 400. The S/W control unit 400 generates the whitelist. Each of the packet transmission units 500 is connected to an external device such as a terminal or another packet relay device through a line such as a metal cable or an optical cable and transmits a packet received from the packet transfer unit 300 to the connected external device.

The packet reception unit 200 and the packet transmission unit 500 are usually constituted by hardware. Note that, although the packet reception unit 200 and the packet transmission unit 500 are depicted as separate units in FIG. 1 for the purpose of explanation, the packet reception unit 200 and the packet transmission unit 500 may be integrated as a packet transmission/reception unit.

An input/output device 610 is connected to the input/output interface 600. The input/output interface 600 accepts an input from a user via the input/output device 610. In addition, the input/output interface 600 outputs the execution result of a program and the like to the input/output device 610. The input/output device 610 includes, for example, an input device that receives an input from a user, such as a keyboard and a mouse, and an output device that outputs the processing result of the packet relay device 100 in a form that the user can visually recognize, such as a display device and a printer.

Note that, in FIG. 1, although the input/output device 610 is depicted as an independent device from the packet relay device 100, the input/output device 610 such as a display or an operation button may be equipped in the packet relay device 100.

The packet transfer unit 300 includes a whitelist retention memory 310, a transfer destination resolution unit 320, a transfer table memory 330, and a transfer setting memory 340. The whitelist retention memory 310 is, for example, a content addressable memory (CAM) or a dynamic random access memory (DRAM) and retains the whitelist generated by the S/W control unit 400.

The transfer table memory 330 is, for example, a CAM or a DRAM and retains information indicating a correspondence between header information on a packet (e.g., MAC address, an Internet protocol (IP) address, a protocol, and a port number) and a transfer destination of the packet, that is, the packet transmission unit 500. This information is created by an administrator or the like and retained in the transfer table memory 330 in advance. A MAC address table used for layer 2 communication of an open systems interconnection (OSI) reference model and a routing table used for layer 3 communication of the OSI reference model are examples of the information indicating this correspondence.

The transfer setting memory 340 is, for example, a DRAM and retains setting information such as a mode and a state of the packet relay device 100 to be described later and an operation at the time of receiving a packet not registered in the whitelist. The setting information retained in the transfer setting memory 340 is set by an administrator or the like via the input/output device 610.

The transfer destination resolution unit 320 receives a packet from the packet reception unit 200 and searches the transfer table memory 330 using the header information on the received packet as a key to resolve the transfer destination of the received packet.

When receiving a packet during a whitelist practical state to be described later, the transfer destination resolution unit 320 searches the whitelist retained in the whitelist retention memory 310 and judges whether the received packet is a whitelist target packet. When judging that the received packet is a packet not registered in the whitelist, the transfer destination resolution unit 320 performs, on this packet, a process indicated by an operation setting at the time of receiving a packet not registered in the whitelist held in the transfer setting memory 340.

Upon receiving a packet during a whitelist generation state to be described later, the transfer destination resolution unit 320 extracts predetermined header information (e.g., the MAC address, the IP address, the protocol, and the port number) and predetermined control information (e.g., the packet reception unit number and the VLAN number) from the received packet to transmit to the S/W control unit 400. In accordance with the setting content of the transfer setting memory 340, the transfer destination resolution unit 320 distinguishes, for example, whether communication using the whitelist is to be carried out.

The packet transfer unit 300 is usually constituted by hardware in order to execute simple commands at high speed, such as high-speed search in the whitelist and communication of a packet at a wire rate. The packet transfer unit 300 may be constituted by, for example, a field programmable gate array (FPGA).

The S/W control unit 400 includes a control processing unit (CPU) 410 and a S/W memory 420. The CPU 410 includes a processor that executes a program retained in the S/W memory 420. The S/W memory 420 includes a read only memory (ROM) which is a nonvolatile storage element and a random access memory (RAM) which is a volatile storage element. The ROM retains an invariable program (for example, a basic input/output system (BIOS)) and the like. The RAM is a high-speed volatile storage element such as a DRAM and temporarily retains a program executed by the processor and data used at the time of execution of the program.

The S/W memory 420 includes a whitelist generation program 421, a transfer setting program 422, and a redundancy protocol control program 423.

The program retained in the S/W memory 420 is executed by the CPU 410 (processor) so as to perform a defined process while using a storage device, a communication port (communication device), and the like. Accordingly, in the present embodiment and other embodiments, the explanation using the program as the subject may be deemed as an explanation using the CPU 410 as the subject. Alternatively, the process executed by the program is a process performed by a calculator and a calculator system on which this program operates.

The CPU 410 operates as a functional unit that implements a predetermined function by operating in accordance with the program. For example, the CPU 410 functions as a whitelist generation unit by operating in accordance with the whitelist generation program 421, functions as a transfer setting unit by operating in accordance with the transfer setting program 422, and functions as a redundancy protocol control unit by operating in accordance with the redundancy protocol control program 423. Furthermore, the CPU 410 also operates as a functional unit that implements each of a plurality of processes executed by each program. The calculator and the calculator system are a device and a system including these functional units.

The whitelist generation program 421 generates a whitelist from the control information and the header information received from the transfer destination resolution unit 320 to write into the whitelist retention memory 310.

The transfer setting program 422 writes a transfer setting input from the input/output device 610 into the transfer setting memory 340.

The redundancy protocol control program 423 is a program for the packet relay device 100 to operate as a node in a network in response to a network redundancy protocol such as a ring protocol and a spanning tree protocol to be described later and controls transmission and reception of a control packet corresponding to each protocol, route switching at the time of receiving the control packet, and the like.

Figure 2:
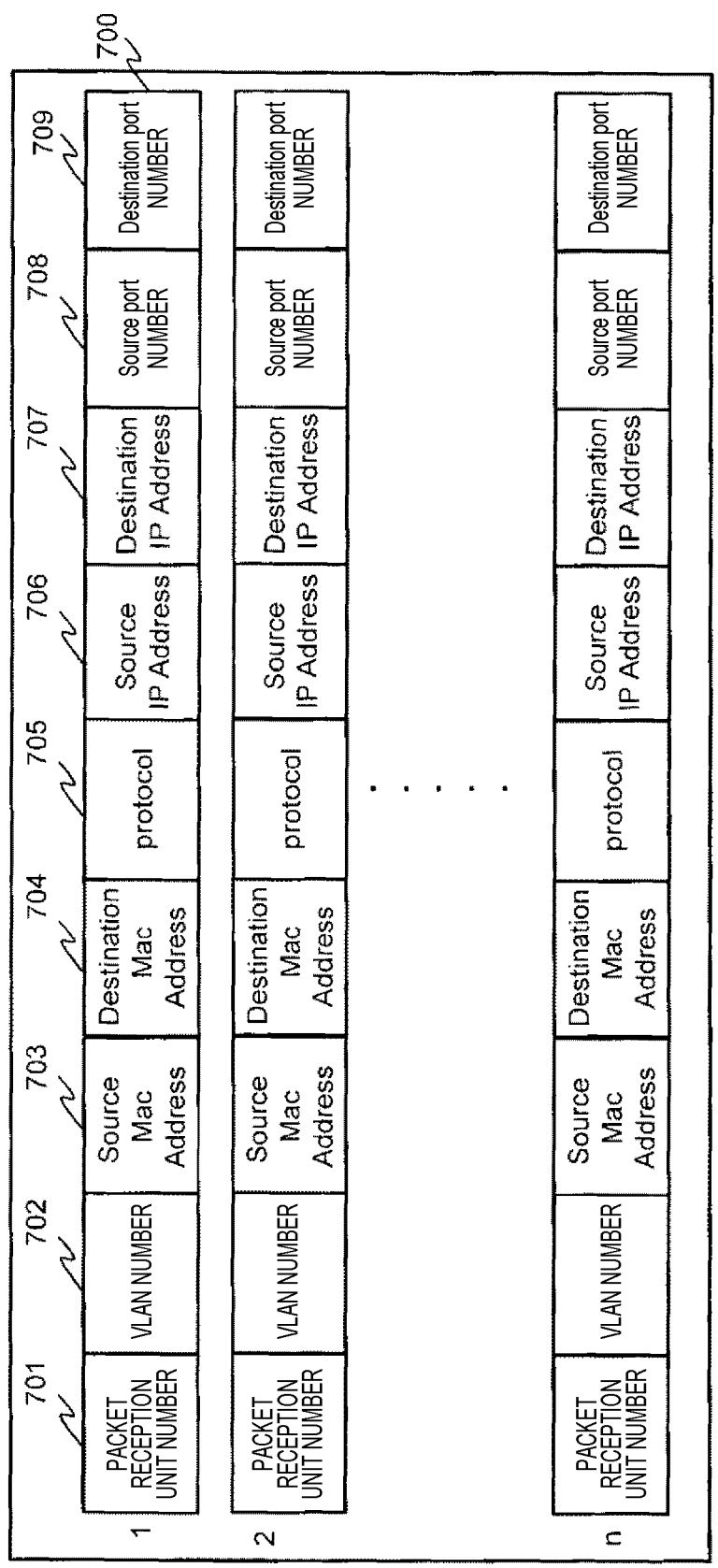
FIG. 2 is an example of a whitelist in the first embodiment.

FIG. 2 illustrates an example of the whitelist retained in the whitelist retention memory 310. In the example in FIG. 2, the whitelist includes n entries. Each entry in the whitelist includes a plurality of parameters. Each of this plurality of parameters represents the control information or the header information extracted by the transfer destination resolution unit 320 from the packet received from the packet reception unit 200.

An entry 700 is an example of the entries included in the whitelist. The entry 700 includes, for example, a packet reception unit number 701 and a VLAN number 702, each of which is a parameter indicating the control information on the packet. The entry 700 includes, for example, a souce MAC address 703, a destination MAC address 704, a protocol 705, a source IP address 706, a destination IP address 707, a source port number 708, and a destination port number, each of which is a parameter indicating the header information on the packet.

The packet reception unit number 701 is a number uniquely identifying each of the packet reception units 200. The packet reception unit 200 that has received the packet is specified by the packet reception unit number 701. The VLAN number 702 is a number uniquely identifying a VLAN to which the packet reception unit 200 belongs.

The source MAC address 703 indicates a transmission source MAC address of the packet. The destination MAC address 704 indicates a MAC address to which the packet is addressed. The protocol 705 indicates the type of protocol. The source IP address 706 indicates a transmission source IP address of the packet. The destination IP address 707 indicates an IP address to which the packet is addressed. The source port number 708 indicates a transmission source port number of the packet. The destination port number 709 indicates a port number to which the packet is addressed.

Note that the entry 700 is not limited to the example in FIG. 2 and is only required to include parameters indicating one or more kinds of the control information and parameters indicating plural kinds of the header information. The entry 700 may include header information such as a type of service (TOS), a flag, a time to live (TTL), an identification (ID), a version, and a header value in addition to or instead of the above-mentioned parameters indicating the header information.

FIG. 3 illustrates an example of transfer setting information held by the transfer setting memory 340. The transfer setting information includes, for example, held information 501 indicating the class of the transfer setting, a held content 502 indicating the state of the held information 501, and an initial state 503 indicating the initial state of the held content 502. In FIG. 3, a plurality of values delimited by "/" are set down in each cell indicating the held content 502, but actually one of the plurality of these values is retained. The initial state 503 retains one of a plurality of values set down in the corresponding held content 502.

Hereinafter, an example of an outline of the operation of the packet relay device 100 in accordance with the transfer setting information will be described.

Upon receiving a packet, the transfer destination resolution unit 320 refers to the transfer setting memory 340 and judges whether the held content 502 of a record 504 indicates a whitelist switch mode in which the whitelist function is enabled or a normal switch mode in which the whitelist function is disabled. When the held content 502 of the record 504 indicates the normal switch mode, the transfer destination resolution unit 320 searches the transfer table memory 330 using the header information on the received packet as a key. The transfer destination resolution unit 320 resolves the transfer destination in accordance with the search result and transfers the packet. When the held content 502 of the record 504 indicates the whitelist switch mode, the transfer destination resolution unit 320 refers to the transfer setting memory 340 and judges whether the held content 502 of a record 505 indicates a generation state in which the whitelist is to be generated or a practical state in which transfer using the whitelist is to be performed.

Hereinafter, an operation example in a case where the held content 502 of the record 505 indicates the generation state will be described. The transfer destination resolution unit 320 performs the same process as packet transfer in the normal switch mode on the received packet and at the same time transmits the predetermined header information and the predetermined control information on the received packet to the whitelist generation program 421 being executed by the CPU 410. The CPU 410 generates a whitelist from the header information and the control information on the packet received from the transfer destination resolution unit 320 using the whitelist generation program 421 and writes the generated information into the whitelist retention memory 310.

Hereinafter, an operation example in a case where the held content 502 of the record 505 indicates the practical state will be described. The transfer destination resolution unit 320 judges whether the packet received from the packet reception unit 200 has been already registered in the whitelist retained in the whitelist retention H/W memory 310. When this packet has been already registered in this whitelist, the transfer destination resolution unit 320 performs the same process as packet transfer in the normal switch mode on the received packet.

When this packet has not yet been registered in this whitelist, the transfer destination resolution unit 320 refers to the transfer setting memory 340 and performs a process indicated by the held content 502 of a record 506 on this packet. The process indicated by the held content 502 of the record includes, for example, discarding this packet and passing this packet, that is, transfer of this packet same as packet transfer in the normal switch mode.

In addition, when receiving the packet from the packet reception unit 200, the transfer destination resolution unit 320 refers to the held content 502 of a record 507 in the transfer setting memory 340 and judges whether a value corresponding to the packet reception unit number included in the received packet is "target" or "excluded from target". When the value corresponding to the packet reception unit number included in the received packet is "excluded from target", the transfer destination resolution unit 320 performs the same process as that in the normal switch mode on this packet regardless of other setting information.

A record 508 will be described with reference to FIG. 9 to be described later.

FIG. 4 illustrates an example of a command list relating to the transfer setting for which the transfer setting program 422 accepts an input from the input/output device 610. The command relating to the transfer setting includes, for example, a command class 1101 indicating the class of command, a setting content 1102 indicating the setting content of a command indicated by the command class 1101, and an initial state 1103 indicating the initial state of the setting content 1102.

Each of the commands indicated by records 1104 to 1108 is a command to change the transfer setting indicated by each of the records 504 to 508 of the transfer setting memory 340. The command class 1101, the setting content 1102, and the initial state 1103 of the records 1104 to 1108 correspond to the held information 501, the held content 502, and the initial state 503 of the records 504 to 508 of the transfer setting memory 340, respectively.

(2) Detailed Operation

Figure 15:
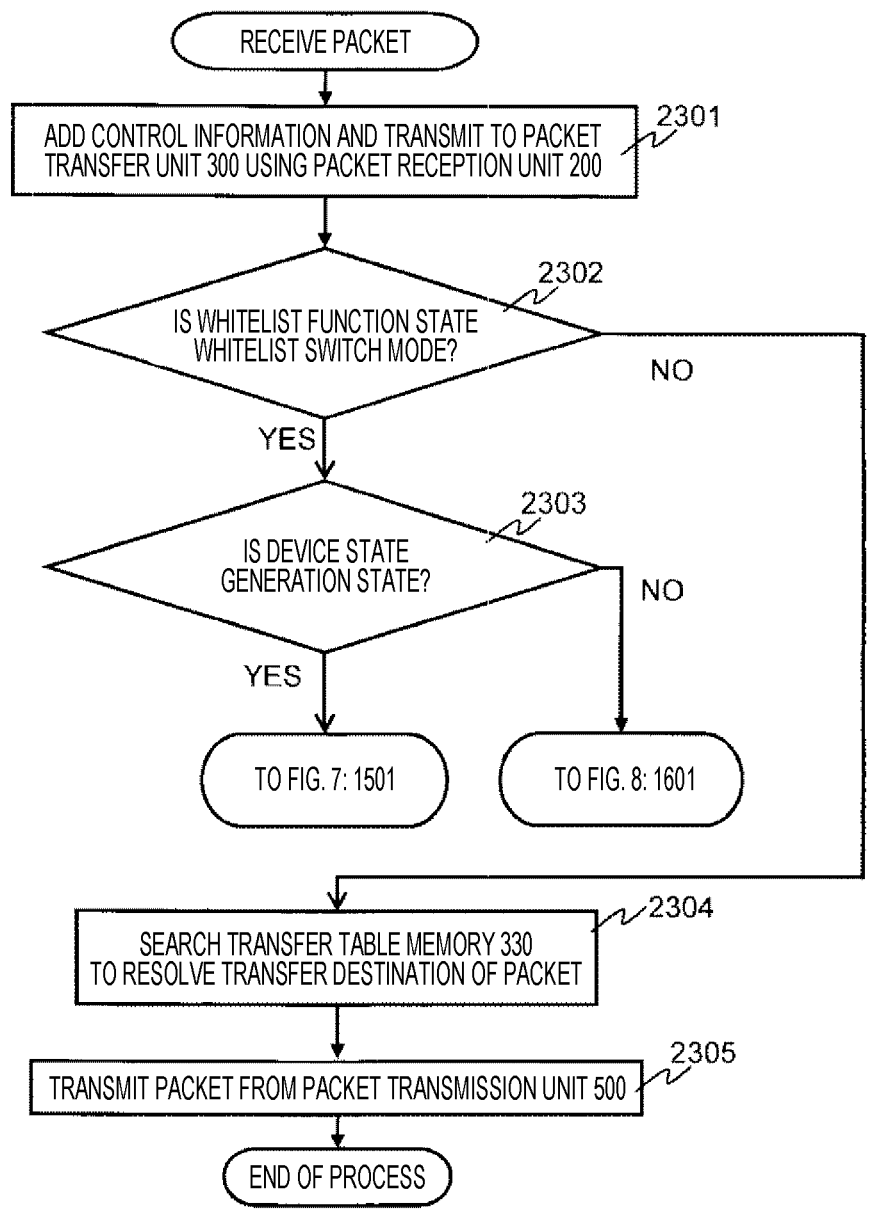
FIG. 15 is an example of a flowchart illustrating an operation at the time of receiving a packet in the first embodiment.

FIG. 15 is a flowchart illustrating the operation of the packet relay device 100 of the present embodiment according to the setting content of the transfer setting memory 340 when a packet from the outside is received. Note that details of each process in the generation state and the practical state will be described later.

When one of the packet reception units 200 of the packet relay device 100 receives the packet, this one of the packet reception units 200 adds the control information as described above to the reception packet and transmits the reception packet to the transfer destination resolution unit 320 (step 2301). Upon receiving the packet, the transfer destination resolution unit 320 checks the held information 502 of the record 504 in the transfer setting memory 340 and judges whether a function state of the whitelist is the whitelist switch mode or the normal switch mode (step 2302).

Hereinafter, a case where the function state is judged as the whitelist switch mode in step 2302 will be described. The transfer destination resolution unit 320 checks the held information 502 of the record 505 in the transfer setting memory 340 and judges whether the held information 502 indicates the generation state in which the whitelist is to be generated or the practical state in which transfer using the whitelist is to be performed (step 2303). As a result of the judgment, when the held information 502 indicates the generation state, the process proceeds to step 1501 in FIG. 7 to be described later to automatically generate the whitelist. As a result of the judgment, if the held information 502 indicates the practical state, the process proceeds to step 1601 in FIG. 8 to be described later to carry out communication control based on the generated whitelist.

Note that the generation state and the practical state for the whitelist are changed, for example, depending on an input from the input/output device 610 by an administrator or the like as described earlier. A sterilization period, for example, when a network is constructed is assumed for the generation state and it is assumed that normal communication is carried out in the sterilization period to automatically generate a whitelist and then the state is shifted to the practical state by an administrator or the like.

Hereinafter, a case where the function state is judged as the normal switch mode in step 2302 will be described.

The transfer destination resolution unit 320 searches the transfer table memory 330 using a header portion of the reception packet and the control information thereon as a key to resolve the transfer destination (step 2304). The packet whose transmission destination has been resolved by the transfer destination resolution unit 320 is transmitted from one of the packet transmission units 500 (step 2305) and the process is terminated.

Hereinafter, an operation when a plurality of packet relay devices 100 of the present embodiment is arranged and the ring protocol is used as an example of the redundancy protocol will be described. The ring protocol is a redundancy protocol for a layer 2 network used in a network in which network switches are connected in a ring shape. When the state of the ring-shaped network is monitored using a packet dedicated for control and a change in state such as a failure or a failure recovery is detected, a function of switching the communication route is implemented. It is assumed hereinafter that, as an example, the ring protocol operates as described in NPL 1 and, as also for the terms in the explanation, the terms used in "1.3 Glossary" of NPL 1 will be used. However, the packet reception unit and the packet transmission unit other than the ring port described in "1.3 Glossary" will be assumed to be referred to as edge ports.

Figure 5A:
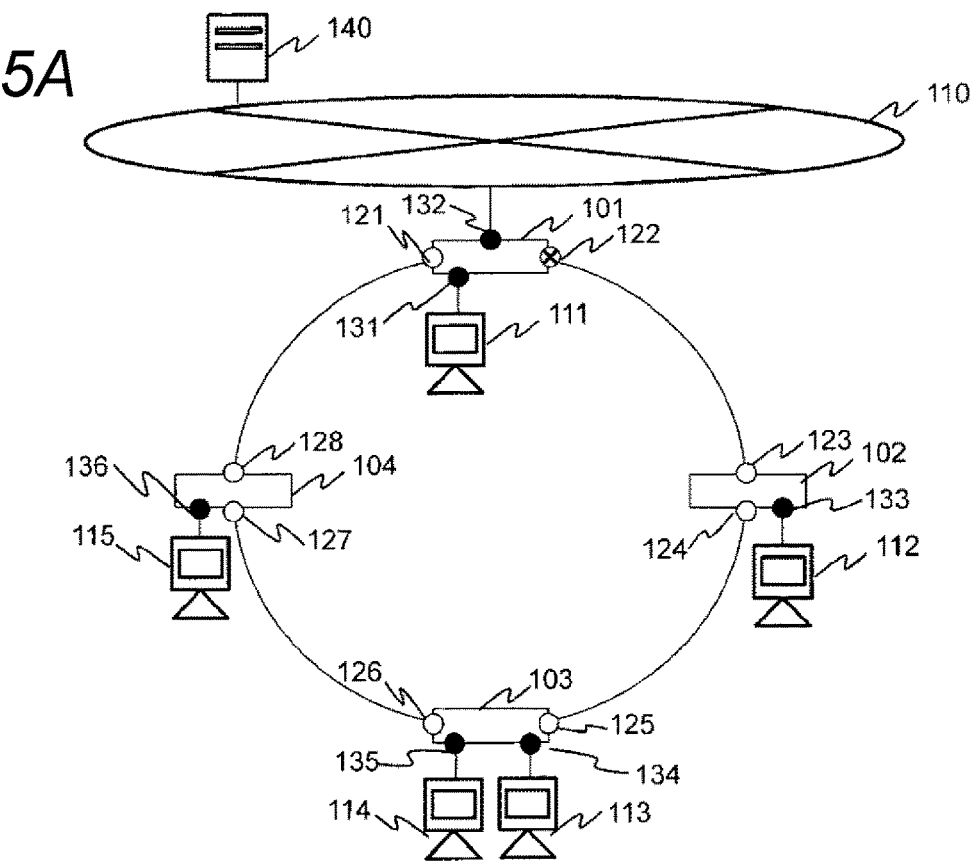
FIG. 5A is an example of a general ring configuration network using a communication device.

FIG. 5A is an example of a configuration diagram in a case where a plurality of packet relay devices is arranged and a ring-shaped configuration is formed. Hereinafter, packet relay devices 101 to 104 will be described as the packet relay device of the present embodiment. Each of the packet relay devices 101 to 104 are connected through the packet reception unit 200 and the packet transmission unit 500 and operates according to the ring protocol.

Note that, in FIG. 5A, the explanation will be made hereinafter assuming that the packet reception unit 200 and the packet transmission unit 500 are integrated as a packet transmission/reception unit. Reference numerals 121 to 128 and 131 to 136 in FIG. 5A represent the packet transmission/reception units. In addition, the packet relay device 101 is also connected to a terminal 111 and a network 110 that transmit and receive a packet. The packet relay device 102 is connected to a terminal 112 that transmits and receives a packet, the packet relay device 103 is connected to terminals 113 and 114 that transmit and receive a packet, and the relay device 104 is connected to a terminal 115 that transmits and receives a packet. In addition to communication between the terminals, the terminals 111 to 115 can also communicate with a server 140 via the network 110.

The packet transmission/reception units 121 to 128 serve as the ring ports (white circles in the drawing), whereas the packet transmission/reception units 131 to 136 serve as the edge ports (black circles in the drawing). The packet relay device 101 serves as a master node, the packet transmission/reception unit 121 is assigned as a primary port, and the packet transmission/reception unit 122 is assigned as a secondary port. In the ring protocol, the primary port transmits and receives a communication packet regardless of whether there is a failure. The secondary port does not transmit or receive a packet while the network is operating normally and transmits and receives a packet when a failure occurs. The packet relay devices 102 to 104 serve as transit nodes.

A health check frame and a flush control frame to be sent out from the packet relay device 101 are generated by the CPU 410 operating in accordance with the redundancy protocol control program 423 and transmitted from the packet transmission/reception units 121 and 122.

In a case where each of the packet relay devices 101 to 104 are operating in the normal switch mode while there is no failure in the network in FIG. 5A, when a packet addressed to the terminal 111 is transmitted from the terminal 112, the transfer destination resolution unit 320 refers to the information in the transfer table memory 330 to try to transmit the packet after the packet is received by the packet transmission/reception unit 133 of the relay device 102. In the initial state, however, since there is no information on the destination address in the transfer table memory 330, flooding of the packet used in the general layer 2 communication is carried out and at the same time the MAC address allocated to the terminal 112 is combined with the number of the packet transmission/reception unit 133 to which the terminal 112 is connected to be saved in the transfer table memory 330. For the purpose of explanation, the MAC address allocated to the terminal 112 will be denoted hereinafter by a symbol "A".

The flooded packet is received by the packet transmission/reception unit 122 of the packet relay device 101 and the packet transmission/reception unit 125 of the packet relay device 103. However, since the packet transmission/reception unit 122 is a secondary port, the reception packet is discarded. As for the packet received by the packet transmission/reception unit 125 of the packet relay device 103, flooding is carried out and the information is saved in the transfer table memory 330 similarly to the case of the relay device 102. Thereafter, flooding is carried out and the information is saved in the transfer table memory 330 repeatedly such that this packet is sent out from the packet transmission/reception unit 131 of the packet relay device 101 and reaches the terminal 111 finally.

FIGS. 6A_101 to 6A_104 illustrate an example of information saved in the transfer table memories 330 of the respective packet relay devices 101 to 104 after the packet addressed to the terminal 111 is transmitted from the terminal 112. A packet transmission/reception unit number 1201 and a transmission source 1202 allocated to the terminal 112 are kept as a combination of information to indicate which transmission source is connected to which packet transmission/reception unit. The communication from the terminal 111 to the terminal 112 is hereafter carried out according to the information in FIGS. 6A_101 to 6A_104 without performing flooding.

Figure 5B:
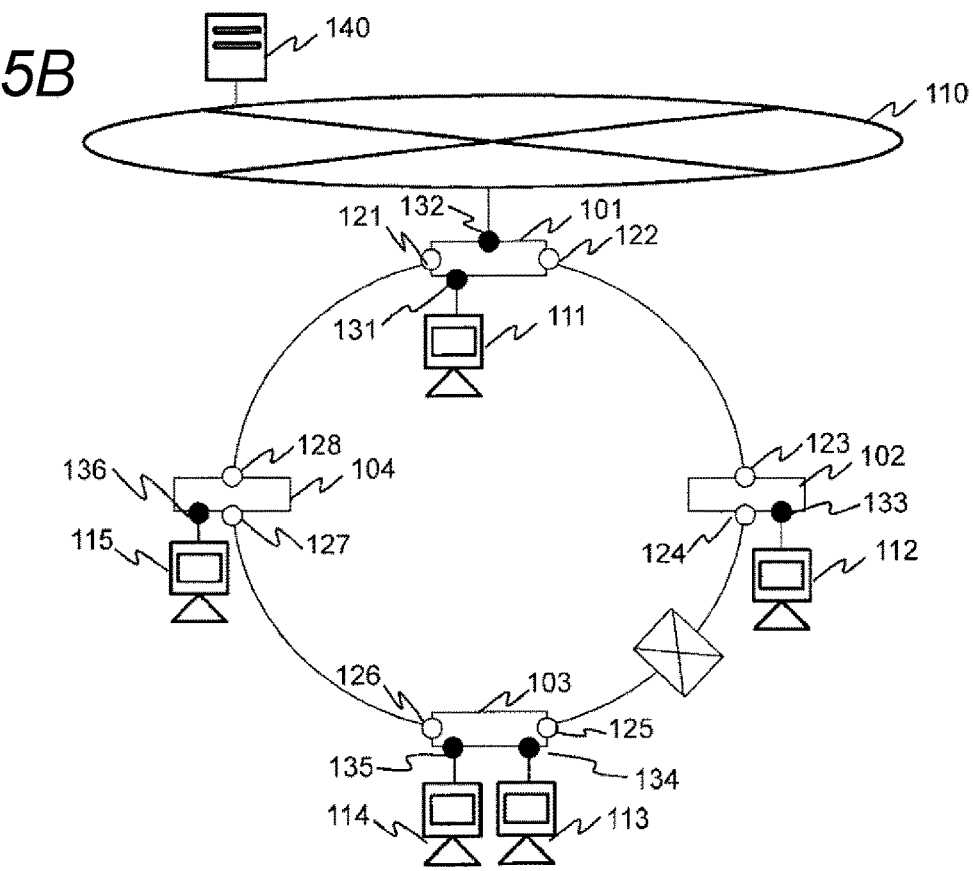
FIG. 5B is an example of a case where a failure occurs in the general ring configuration network using the communication device.

In a case where a cable connecting the packet transmission/reception units 124 and 125 is disconnected for some reason as illustrated in FIG. 5B after the above communication is carried out, since the reachability of the health check frame sent out from the master node is lost, the flush control frame is transmitted from the master node and the information on the MAC address and the packet transmission/reception unit in the respective transfer table memories 330 in the packet relay devices 101 to 104 is deleted. Furthermore, the master node releases a communication-disabled state of the packet reception unit 122 serving as the secondary port so as to continue the communication.

For example, after the packet addressed to the terminal 111 from the terminal 112 is received by the packet transmission/reception unit 133 of the packet relay device 102, the transfer destination resolution unit 320 refers to the information in the transfer table memory 330 to try to transmit the packet. However, since the information in the transfer table memories 330 depicted in FIGS. 6A_101 to 6A_104 has been deleted by the flush control frame, flooding of the packet used in the general layer 2 communication is carried out and at the same time, information that the terminal 112 is connected to the packet transmission/reception unit 133 is saved again in the transfer table memory 330.

Since the link of the packet transmission/reception unit 124 is down, the packet does not reach the packet relay device 103 but is received by the packet transmission/reception unit 122 of the packet relay device 101 to be flooded by the packet relay device 101, thereby reaching the terminal 111.

FIGS. 6B_101 to 6B_104 illustrate an example of information saved in the transfer table memories 330 of the respective packet relay devices 101 to 104 after the packet addressed to the terminal 111 is transmitted from the terminal 112 in the state of FIG. 5B. With the above operation, the ring protocol has an effect of continuing communication even when a failure occurs at any point on the network.

For the purpose of whitelisting the communication on the network with the above configuration using the technologies of PTL 1 and PTL 2, in order to cope with the above-described switching of the communication route, all of the communication whose routes have the possibility of being switched must be set in the whitelist or all failure patterns must be carried out during the generation state for the whitelist to be registered, with respect to each packet reception unit of each of the packet relay devices 101 to 104. Even in a plain ring configuration as illustrated in FIG. 5A or 5B, there is a plurality of patterns of failures. In a multi-ring configuration or the like in which ring configurations overlap, the pattern of failure and the pattern of route switching further increase and thus it is assumed to be substantially impossible for the conventional technologies to carry out route redundancy on the network while using the whitelist function.

In the present embodiment, for example, depending on the value of the held content 502 of the record 507 in the transfer setting memory 340 set in accordance with the command from the input/output device 610 relating to the transfer setting, it is possible to select between the packet reception unit 200 that generates the whitelist and is assigned as the target of generation and control of the whitelist and the packet reception unit 200 that does not generate the whitelist and excluded from the target of generation and control of the whitelist, regarding the packet relay devices 101 to 104 illustrated in FIGS. 5A and 5B.

In FIGS. 5A and 5B, values are set such that the packet transmission/reception units 131 to 136 which are the edge ports (black circles) are assigned as the targets of generation and control of the whitelist and the packet transmission/reception units 121 to 128 which are the ring ports (white circles) are excluded from the targets of generation and control of the whitelist. By assigning the packet transmission/reception units 131 to 136 as the targets of generation and control of the whitelist, it is possible to whitelist the communication with the connected terminals 111 to 115 and server 140 and to block unauthorized communication by way of and from inside the network 110. Furthermore, by excluding the packet transmission/reception units 121 to 128 from the targets of generation and control of the whitelist, it is also possible to cope with a change in communication path at the time of disconnection illustrated in FIG. 5B.

Figure 7:
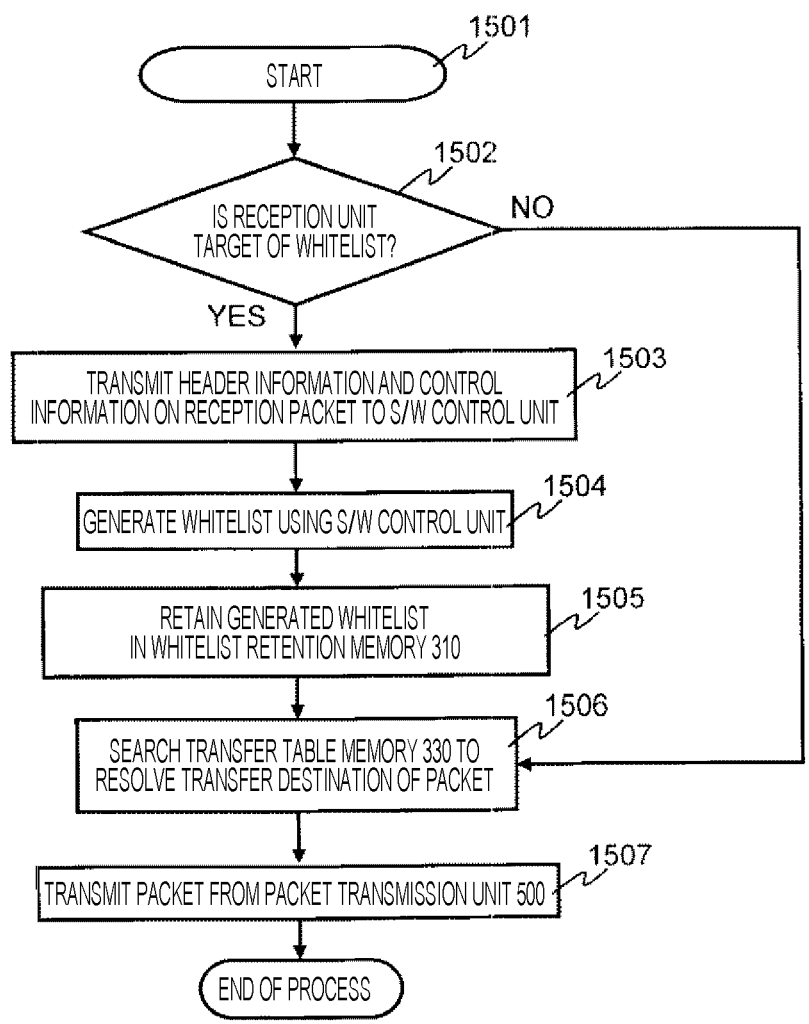
FIG. 7 is an example of a flowchart illustrating an operation in a whitelist generation state in the first embodiment.

FIG. 7 is an example of a flowchart describing an operation in a case where it is judged in step 2303 of FIG. 15 that the generation state is activated.

Upon receiving the packet, the transfer destination resolution unit 320 checks the held information 502 of the record 507 in the transfer setting memory 340 and judges whether the number of the packet reception unit 200 appearing in the control information is the target of generation and control of the whitelist (step 1502).

Hereinafter, a case where the number of the packet reception unit 200 included in the control information on the reception packet is the target of generation and control of the whitelist as a result of the judgment in step 1502 will be described. The transfer destination resolution unit 320 transmits the header portion of the reception packet and the control information thereon to the S/W control unit 400 (step 1503). Once the S/W control unit 400 receives the header portion of the reception packet and the control information thereon, the CPU 410 causes the processor present therein to operate as a whitelist generation unit and generates a whitelist according to the header portion and the control information in accordance with the information depicted in FIG. 2 (step 1504). Furthermore, the CPU 410 operating as the whitelist generation unit writes the generated whitelist into the whitelist retention memory 340 (step 1505). Then, the transfer destination resolution unit 320 searches the transfer table memory 330 using the header portion of the reception packet and the control information thereon as a key to resolve the transfer destination (step 1506). The packet transfer unit 300 transmits the packet whose transmission destination has been resolved by the transfer destination resolution unit 320 from one of the packet transmission units 500 (step 1507) and terminates the process.

As a result of the judgment in step 1502, when the number of the packet reception unit 200 included in the control information on the reception packet is excluded from the target of generation and control of the whitelist, the transfer destination resolution unit 320 carries out the processes in steps 1506 and 1507 described above without carrying out the generation process for the whitelist and terminates the process.

Figure 8:
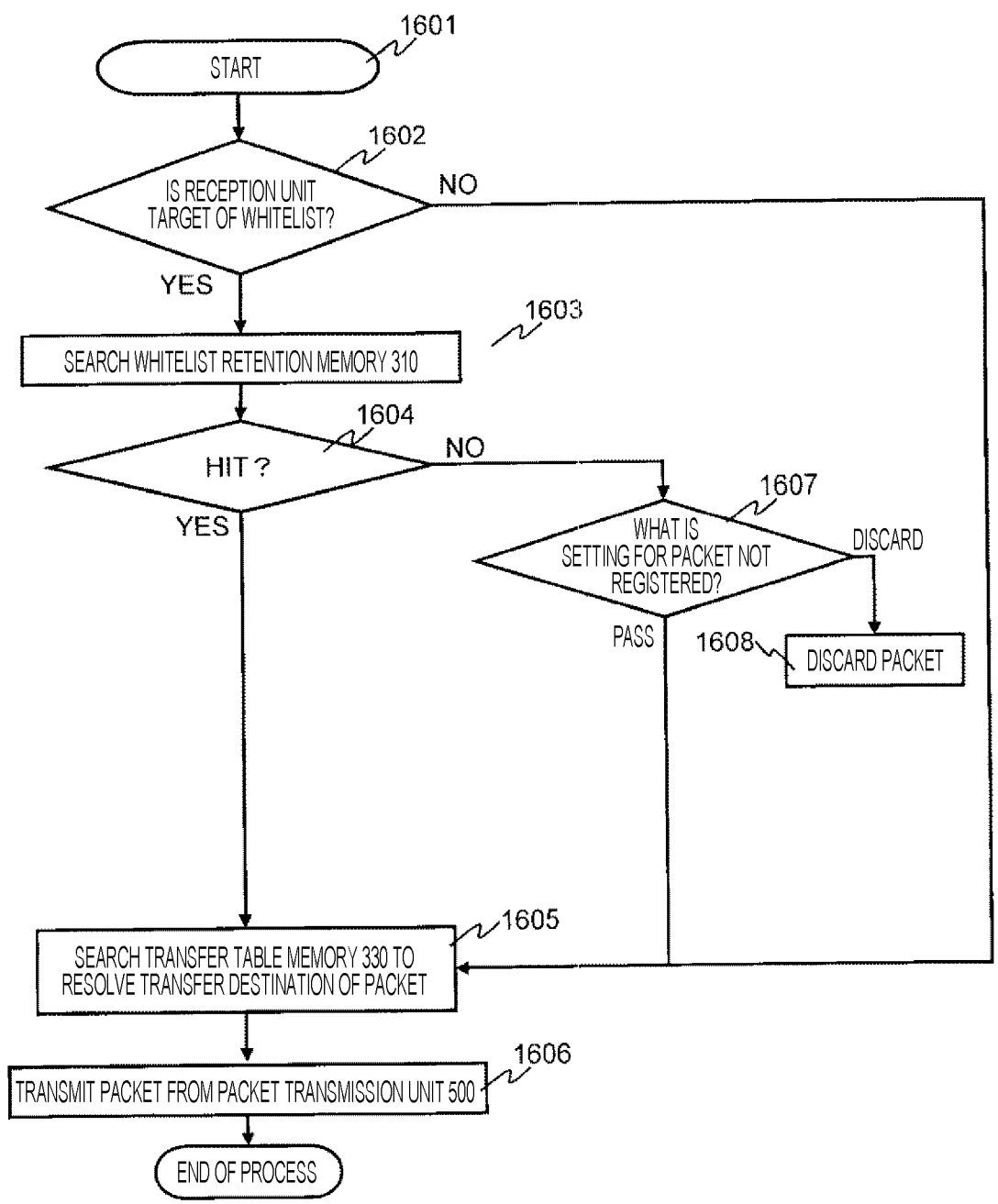
FIG. 8 is an example of a flowchart illustrating an operation in a whitelist practical state in the first embodiment.

FIG. 8 is an example of a flowchart describing an operation in a case where it is judged in step 2303 of FIG. 15 that the practical state is activated.

Upon receiving the packet, the transfer destination resolution unit 320 checks the held information 502 of the record 507 in the transfer setting memory 340 and judges whether the number of the packet reception unit 200 appearing in the control information is the target of generation unit and control of the whitelist (step 1602).

Hereinafter, a case where the number of the packet reception unit 200 included in the control information on the reception packet is the target of generation and control of the whitelist as a result of the judgment in step 1602 will be described. Upon receiving the packet, the transfer destination resolution unit 320 searches the whitelist retention memory 310 (step 1603). Then, it is judged whether the header information and the control information allocated to the received packet are retained in the whitelist retention memory 310 and a hit has been made (step 1604).

Hereinafter, a case where a hit has been made in the search in step 1604 will be described. The transfer destination resolution unit 320 searches the transfer table memory 330 using the header portion of the reception packet and the control information thereon as a key to resolve the transmission destination (step 1605). The packet transfer unit 300 transmits the packet whose transmission destination has been resolved by the packet transfer unit 300 from one of the packet transmission units 500 (step 1606) and terminates the process.

Hereinafter, a case where a hit has not been made in the search in step 1604 will be described. The transfer destination resolution unit 320 checks the held information 502 of the record 506 in the setting transfer memory 340 and distinguishes whether the held information 502 indicates discarding or passing (step 1607). When it is judged in step 1607 that the held information 502 indicates passing, the process advances to step 1605. When it is judged in step 1607 that the held information 502 indicates discarding, the transfer destination resolution unit 320 discards the packet (step 1608) and terminates the process.

As a result of the judgment in step 1602, when the number of the packet reception unit 200 included in the control information on the reception packet is excluded from the target of generation and control of the whitelist, the processes in steps 1605 and 1606 described above are carried out without carrying out the search in the whitelist retention memory 340 and the process is terminated.

In a case where, in the network configuration in FIG. 5A, the held content 502 of the record 504 in the transfer setting memory 340 of each of the packet relay devices 101 to 104 of the present embodiment is assigned to the whitelist switch mode, the held content 502 of the record 505 is assigned to the generation state, and the value of the held content 502 of the record 507 are set such that the packet transmission/reception units 131 to 136 serving as the edge ports are assigned as the targets of generation and control of the whitelist and the packet transmission/reception units 121 to 128 serving as the ring ports are excluded from the targets of generation and control of the whitelist, when communication is carried out from the terminal 112 to the terminal 111, the generation process for the whitelist is performed only in a case where the packet transmission/reception unit 133 of the packet relay device 102 receives a packet. As described above, the packet transmitted from the terminal 112 is received by the packet transmission/reception unit 125 of the packet relay device 103, the packet transmission/reception unit 127 of the packet relay device 104, and the packet transmission/reception unit 121 of the packet relay device 101. As described above, however, all of the packet transmission/reception units are excluded from the targets of generation and control of the whitelist and thus the whitelist is not generated.

Even in a case where, after the communication from the terminal 112 to the terminal 111 is carried out as described above, for example, the held contents 502 of the records 505 in the transfer setting memories 340 of the packet relay devices 101 to 104 of the present embodiment are assigned to the practical state by the input/output device 610 or the like and additionally the failure state in FIG. 5B arises, the communication from the terminal 112 to the terminal 111 can also cope with a route after the route switching described above while the packet reception unit 133 carries out the communication control according to the whitelist.

Note that the ring protocol is used as an example in the above description but the present embodiment can be applied also to the spanning tree protocol in a case where the setting is carried out using the way of classification between a packet transmission/reception unit having the possibility of occurrence of route switching (a designated port and a non-designated port described in NPL 2) and a packet transmission/reception unit having no probability of occurrence of route switching (an edge port described in NPL 2), although an approach for topology calculation at the time of constructing a network and an approach for topology reconstruction at the occurrence of a failure are different from the case of the ring protocol.

Figure 14:
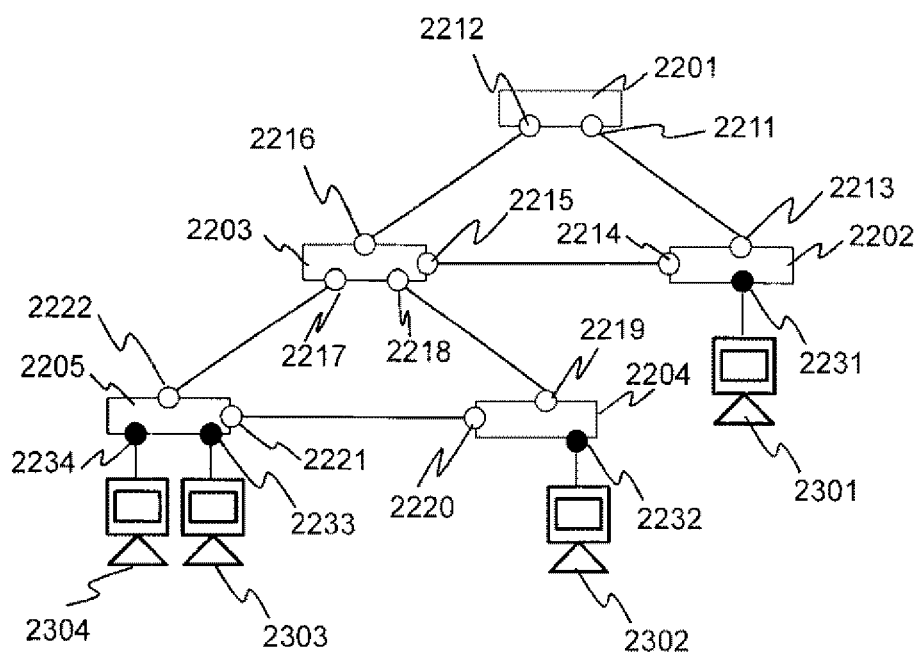
FIG. 14 is an example of a configuration diagram when a network is configured using a spanning tree.

FIG. 14 is an example of a configuration diagram when a network is configured using the spanning tree. In FIG. 14, the network is constituted by packet relay devices 2201 to 2205 and each of the packet relay devices 2201 to 2205 operates according to the spanning tree protocol. The respective packet relay devices 2201 to 2205 are connected through packet transmission/reception units 2211 to 2222 and the packet transmission/reception units 2211 to 2222 serve as the aforementioned packet transmission/reception units having the possibility of occurrence of route switching. Meanwhile, respective terminals 2301 to 2304 are connected to packet transmission/reception units 2231 to 2234 of packet relay devices 2202, 2204, and 2205 on the network and the packet transmission/reception units 2231 to 2234 serve as the aforementioned packet transmission/reception units having no probability of occurrence of route switching.

(3) Closing at Link Down

Incidentally, when a malicious user tries to intrude into a place where a ring-formed network constituted by the packet relay device 100 of the present embodiment is situated and connect a non-legitimate terminal to the packet relay device 100 of the present embodiment to carry out communication, since the packet reception unit 200 serving as the ring port is excluded from the target of generation and control of the whitelist, communication is made possible even if a non-legitimate terminal is connected. As a measure against this disadvantage, the packet relay device of the present embodiment can be supplied with a function of closing the packet reception unit 200 excluded from the target of generation and control of the whitelist at the time of link down (for details, refer to FIG. 9 and so on to be described later). When a malicious user tries to connect a non-legitimate terminal to the ring port, the malicious user needs to remove once a cable connecting between the respective packet relay devices 100 and thus the link down is always brought about. Since the packet reception unit can be closed at the occurrence of a link down according to the setting state of the held content 502 of the record 508 in the transfer setting memory 340 as described earlier, security can be also ensured for the packet reception unit excluded from the whitelist target.

Figure 9:
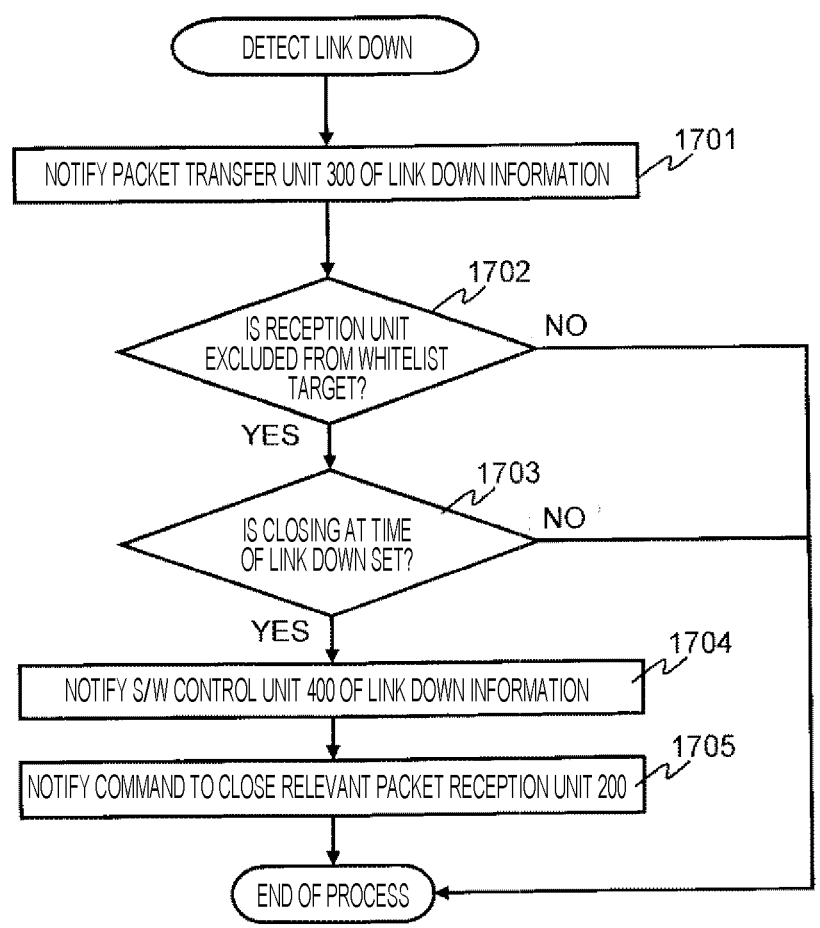
FIG. 9 is an example of a flowchart illustrating an operation at the time of link down of a packet reception unit excluded from a whitelist target in the first embodiment.

FIG. 9 is a flowchart in a case where the held content 502 of the record 504 in the transfer setting memory 340 of the packet relay device 100 of the present embodiment indicates the whitelist switch mode and the packet reception unit 200 excluded from the target of the whitelist detects a link down. Note that, as for the link down, the packet relay device 100 as a general communication device monitors the link state using the packet reception unit 200 or the like and can detect a link down at the time of link down.

Upon detecting the link down, the packet reception unit 200 notifies the packet transfer unit 300 of the packet reception unit number having the link down as link down information (step 1701). Upon receiving the link down information, the packet transfer unit 300 checks the held content 502 of the record 507 in the transfer setting memory 340 to distinguish whether this packet reception unit 200 that has detected the link down is a target of generation and control of the whitelist or excluded from the target (step 1702). When it is distinguished in step 1702 that this packet reception unit 200 is the target of generation and control of the whitelist, the packet transfer unit 300 terminates the process.

Hereinafter, a case where it is distinguished in step 1702 that this packet reception unit 200 is excluded from the target of generation and control of the whitelist will be described. The packet transfer unit 300 distinguishes whether this packet reception unit 200 that has detected the link down is set to close this packet reception unit 200 at the time of link down, from the held content 502 of the record 508 of the transfer setting memory 340 (step 1703). When it is distinguished in step 1703 that this packet reception unit 200 is not set to be closed, the packet transfer unit 300 terminates the process.

Hereinafter, a case where it is distinguished in step 1703 that this packet reception unit 200 is set to be closed will be described. The packet transfer unit 300 notifies the S/W control unit 400 of the link down information (step 1704). Upon receiving the notification, the S/W control unit 400 causes the CPU 410 operating as the transfer setting unit to close this packet reception unit 200 (step 1705). At this time, the CPU 410 operating as the transfer setting unit holds the closed packet reception unit number and maintains the closed state of this packet reception unit 200 until the closed setting thereof is changed to a setting not to be closed by the input/output device 610 or the like in the held content 502 of the record 508 of the transfer setting memory 340. Note that this packet reception unit 200 does not change the closed state even when detecting a link up of this packet reception unit 200. When the closed setting of this packet reception unit 200 is changed to a state not to be closed by the input/output device 610 or the like, the packet reception unit number in the closed state held by the CPU 410 is checked and, when the packet reception unit number is in the closed state, the closed state of this packet reception unit 200 is released.

Note that, as for the packet reception unit 200 as the target of generation and control of the whitelist, when a link down is detected, the state of this packet reception unit 200 is changed to the closed state and, when the link up of this packet reception unit 200 is detected, the state of this packet reception unit 200 is changed to an open state.

C. Second Embodiment

The present embodiment is a variation in which the transfer setting information held by the transfer setting memory 340 is partly changed with respect to the communication device of the first embodiment.

FIG. 10 illustrates an example of the transfer setting information held by a transfer setting memory 340 of a packet relay device of the present embodiment.

In this transfer setting information, held information 1801, held content 1802, an initial state 1803, and records 1804 to 1806 are the same as the held information 501, the held content 502, the initial state 503, and the records 504 to 506 of the first embodiment. A record 1807 is used to distinguish whether the whitelist is to be regenerated (re-learned) when switching of the route occurs, in a case where a network using the redundancy protocol is constructed in accordance with the value of the held content 1802.

A record 1808 is used for the packet reception unit whose value of the held content 1802 of the record 1807 indicates regeneration to distinguish whether this packet reception unit 200 is to be placed in the closed state when this packet reception unit 200 has a link down in a case where the value of the held content 1802 of the record 1809 to be described later indicates a regeneration state.

A record 1809 sets the regeneration state for the whitelist and holds either the regeneration state or the practical state in the held content 502.

FIG. 11 illustrates an example of a command list relating to the transfer setting for which a transfer setting program 422 accepts an input from an input/output device 610. In these commands relating to the transfer setting, a command class 1901, a setting content 1902, an initial state 1903, and records 1904 to 1906 are the same as the command class 1101, the setting content 1102, the initial state 1103, and the records 1104 to 1106 of the first embodiment, while the records 1907 to 1909 are commands to set the held contents 1802 of the records 1807 to 1809 as the transfer setting information, respectively.

Note that, in the present embodiment, records may be added also to FIGS. 10 and 11 regarding the setting for assigning as a whitelist target or excluding from a whitelist target set down in the record 507 in FIG. 3 and the record 1107 in FIG. 4 of the first embodiment. In that case, the respective flowcharts in FIGS. 7 and 8 can be used. However, as an example, explanation will be made here assuming that all the packet reception units are assigned as the targets of generation and control of the whitelist and accordingly, those records are not depicted in FIGS. 10 and 11. Therefore, flowcharts regarding the generation state and the practical state for the whitelist are formed in such a manner that the judgment on whether the packet reception unit 200 is the target of generation and control of the whitelist or excluded from the target (steps 1502 and 1602) is eliminated from the flowcharts for the whitelist generation state/practical state described with reference to FIGS. 7 and 8 of the first embodiment, thereby operating by regarding all the packet reception units 200 as the targets of generation and control of the whitelist.

Figure 12:
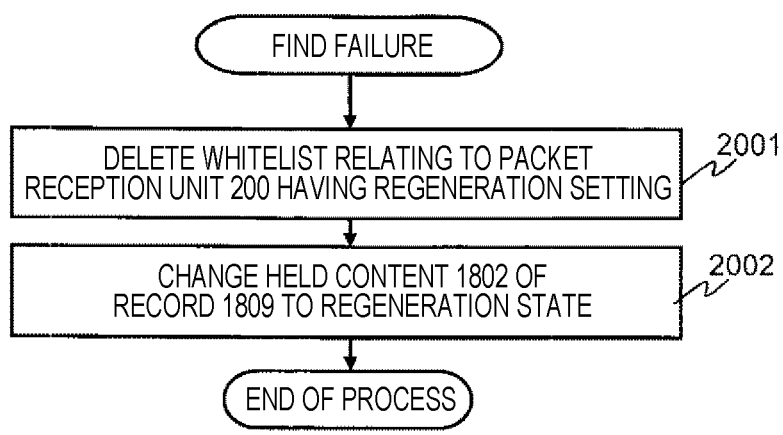
FIG. 12 is an example of a flowchart illustrating a whitelist regeneration setting operation at the occurrence of a network failure in the second embodiment.

FIG. 12 is a flowchart illustrating an operation at the time of route switching when a network failure occurs in a packet relay device 100 of the present embodiment.

Once the packet relay device 100 of the present embodiment finds a failure in the network, a CPU 410 acquires the held content 1802 of the record 1807 from the transfer setting memory 340 using a whitelist generation unit and deletes, from the whitelist retained in a whitelist retention memory 310, one or a plurality of entries whose packet reception number in the entry 701 in FIG. 2 matches the number of one or a plurality of packet reception units 200 having the value of regeneration in the held content 1802 of the record 1807 of the transfer setting memory 340 that has been acquired (step 2001). Upon completing the deletion of all applicable entries, the held content 1802 of the record 1809 of the transfer setting memory 340 is changed to the regeneration state by the whitelist generation unit (step 2002).

Figure 13:
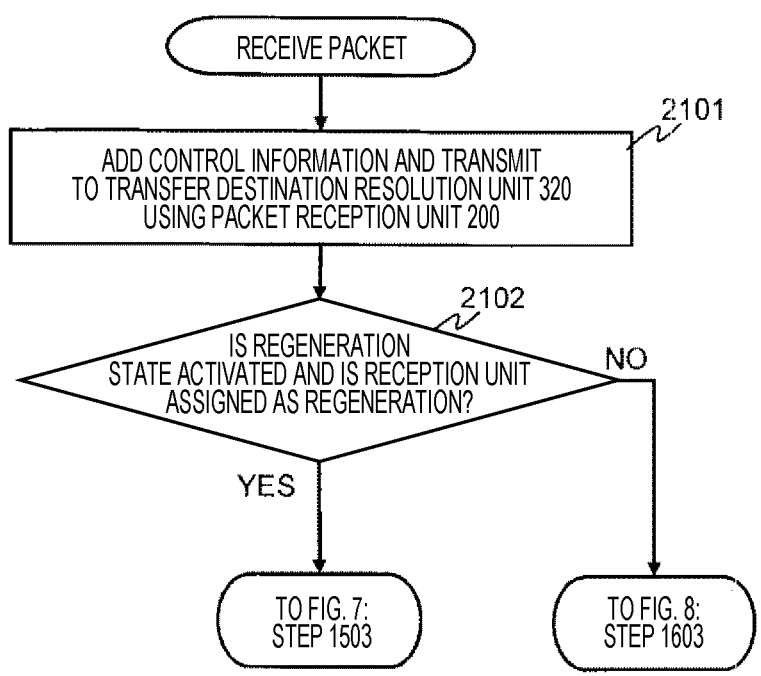
FIG. 13 is an example of a flowchart illustrating an operation in a whitelist practical state in the second embodiment.

FIG. 13 is an example of a flowchart describing an operation in a case where the held content 1802 of the record 1804 in the transfer setting memory 340 of the packet relay device 100 of the present embodiment indicates the whitelist switch mode and the held content 1802 of the record 1805 indicates the practical state.

When one of the packet reception units 200 of the packet relay device 100 receives the packet, this one of the reception units 200 adds the control information to the reception packet and transmits the reception packet to a transfer destination resolution unit 320 (step 2101). Upon receiving the packet, the transfer destination resolution unit 320 checks the information in the transfer setting memory 340 and distinguishes whether the held information 1802 of the record 1809 indicates the regeneration state and the value of the held information 1802 of the record 1807 for the packet reception unit 200 appearing in the control information indicates regeneration (step 2102).

When it is distinguished in step 2102 that the held information 1802 of the record 1809 indicates the regeneration state and the value of the held information 1802 of the record 1807 for the packet reception unit 200 appearing in the control information indicates regeneration, the process proceeds to step 1503 in FIG. 7 of the first embodiment and the CPU 410 generates the whitelist.

When it is distinguished in step 2102 that the held information 1802 of the record 1809 does not indicate the regeneration state or the value of the held information 1802 of the record 1807 for the packet reception unit 200 appearing in the control information indicates non-regeneration, the process proceeds to step 1603 in FIG. 8 of the first embodiment and the transfer destination setting unit 320 carries out communication control based on the whitelist.

For example, in a case where the packet relay devices 101 to 104 of the present embodiment are arranged in the network configuration in FIG. 5A, the held content 1802 of the record 1805 of the transfer setting memory 340 is assigned to the generation state, and the value of the held content 1802 of the record 1807 is set such that packet transmission/reception units 131 to 136 serving as the edge ports (black circles) are assigned not to perform the regeneration and packet transmission/reception units 121 to 128 serving as the ring ports (white circles) are assigned to perform the regeneration, when communication is carried out from a terminal 112 to a terminal 111, the generation process for the whitelist is carried out when a packet is received by the packet transmission/reception units 133, 125, 127, and 121.

In a case where, after the communication from the terminal 112 to the terminal 111 is carried out, the held contents 502 of the records 505 in the transfer setting memories 340 of the packet relay devices 101 to 104 of the present embodiment are assigned to the practical state and additionally the failure state in FIG. 5B arises, the flush control frame is notified from the master node to the transit node. The master node executes the process described with reference to FIG. 12 when finding a failure and the transit node executes the same process when finding a failure at the time of receiving the flush control frame to delete the whitelists generated by the packet transmission/reception units 125, 127, and 121.

Thereafter, when the communication is carried out from the terminal 112 to the terminal 111, the whitelist is regenerated by the packet reception unit 122 which is a route after the route switching described above, while the packet reception unit 133 carries out the communication control according to the whitelist. When the regeneration of the whitelist is completed, a command to assign the record 1909 to the practical state is carried out by the input/output device 610 and all the packet transmission/reception units return to the practical state.

By performing the processes as described above, the list which is no longer necessary can be deleted at the time of route switching and furthermore, a secure practice according to the whitelist can be continued also after route switching.

In addition, similarly to the first embodiment, while a malicious user tries to intrude into a place where a ring-formed network constituted by the packet relay device 100 of the present embodiment is situated and connect a non-legitimate terminal to the packet relay device 100 of the present embodiment to carry out communication, when a failure is caused, for example, by removing a cable of the packet transmission/reception unit serving as the ring port, it is assumed that communication is made possible in a case where a non-legitimate terminal is connected to the packet reception unit 200 set to regenerate the whitelist. As a measure against this disadvantage, the packet relay device of the present embodiment can be supplied with a function of closing the packet reception unit 200 whose whitelist is assigned to the regeneration state at the time of link down. As for the operation, in the first embodiment (refer to FIG. 9), the judgment item at the time of link down is whether the packet reception unit is excluded from the whitelist target. In contrast to this, the judgment item in the present embodiment is whether the relevant packet reception unit 200 is set to regenerate the whitelist and the held content 1802 of the record 1809 of the transfer setting memory 340 indicates the regeneration state.

Note that, although the ring protocol is used as an example in the above description, the present embodiment can be applied also to the spanning tree protocol similarly to the first embodiment.

D. Supplementary Note

The invention is not construed to be limited to the aforementioned embodiments and includes various types of variations. For example, the aforementioned embodiments have been described in detail in order to make the description of the invention easy to understand. Therefore, the embodiments are not necessarily limited to the ones provided with the whole configurations that have been described. In addition, part of the configuration of a certain embodiment can be replaced with the configuration of another embodiment, while it is also possible to add the configuration of a certain embodiment to the configuration of another embodiment. Part of the configuration of each of the embodiments can be subjected to addition, deletion, and replacement of another configuration.

Furthermore, part or all of the respective configurations, functions, processing units, processing means, and the like described above may be implemented by hardware designed, for example, using an integrated circuit. The respective configurations, functions, and the like described above may be implemented by software in which a processor parses a program that implements each of the functions to execute. Information such as the programs, the tables, and the files that implement the respective functions can be placed on a recording device including a memory, a hard disk, and a solid state drive (SSD), or alternatively, a recording medium including an IC card, an SD card, and a DVD.

Meanwhile, the control lines and the information lines considered to be necessary for the description are indicated and therefore, all of the control lines and the information lines on a product are not necessarily indicated. Actually, substantially all of the configurations may be considered to be connected to each other.

REFERENCE SIGNS LIST 100 packet relay device
200 packet reception unit
300 packet transfer unit
310 whitelist retention memory
320 transfer destination resolution unit
330 transfer table memory
340 transfer setting memory
400 S/W control unit
410 CPU
420 S/W memory
421 whitelist generation program
422 transfer setting program
423 redundancy protocol control program
500 packet transmission unit
600 input/output interface
610 input/output device

The invention claimed is:

1. A communication device comprising:
a first reception unit, within a packet relay device, that has a port connected to a redundant network or a ring port or a port capable of being subjected to route switching at the time of failure and is set in advance to be excluded as a target of generation and control of a whitelist which is a list of communication data permitted to be transferred;
a second reception unit, within the packet relay device, that has a port connected to another device or an edge port or a port having no probability of occurrence of route switching at the time of failure and is set in advance as a target of generation and control of the whitelist;
a transfer unit, within the packet relay device, that transfers communication data to a transfer destination defined in advance when determining that the communication data has been received via the first reception unit, in a case where the communication device is set in advance to a whitelist generation state;
a control unit, within the packet relay device, that generates and stores the whitelist based on communication data that has been received and causes the transfer unit to transfer the communication data to a transfer destination defined in advance when the transfer unit determines that the communication data has been received via the second reception unit, in a case where the communication device is set in advance to the whitelist generation state; and
a transfer setting memory in which one or a plurality of the first reception units is set in advance to be excluded from a target of generation and control of the whitelist and one or a plurality of the second reception units is set in advance as a target of generation and control of the whitelist,
wherein in a case where the communication device is set in advance to the whitelist generation state:
the transfer unit refers to the transfer setting memory and determines whether a reception unit that has received communication data is the second reception unit that is the target of generation and control of the whitelist or the first reception unit excluded from the target;
the transfer unit transmits header information on the communication data received by the second reception unit to the control unit when determining that the second reception unit has received the communication data;
the control unit generates a whitelist according to the header information and stores the whitelist to a whitelist retention memory; and
the transfer unit transfers the communication data received via the second reception unit to a transfer destination defined in advance.

2. The communication device according to claim 1, wherein
in a case where the communication device is set in advance to a practical state:
the transfer unit refers to the transfer setting memory and determines whether a reception unit that has received communication data is the second reception unit that is a whitelist target or the first reception unit excluded from the target;
the transfer unit judges whether the header information on the communication data received via the second reception unit is retained in the whitelist retention memory when determining that the second reception unit has received the communication data;
the transfer unit transfers the communication data received via the second reception unit to a transfer destination defined in advance in accordance with the header information when the header information is retained in the whitelist retention memory;

the transfer unit discards the communication data or transfers the communication data to a transfer destination defined in advance in accordance with discard information or pass information defined in advance, respectively, when the header information is not retained in the whitelist retention memory; and the transfer unit transfers the communication data received via the first reception unit to a transfer destination defined in advance when determining that the first reception unit has received the communication data.

3. The communication device according to claim 1, wherein, when finding a link down in a link connected to the first reception unit, the control unit changes the state of the first reception unit to a closed state so as not to change the state of the first reception unit even when finding a link up in the link connected to the first reception unit and, when accepting an opening instruction from the outside, changes the state of the first reception unit to an open state.

4. The communication device according to claim 3, wherein when finding a link down in a link connected to the second reception unit, the control unit changes the state of the second reception unit to the closed state and, when finding a link up in the link connected to the second reception unit, changes the state of the second reception unit to the open state.

5. A communication device comprising:

a first reception unit, within a packet relay device, that has a port connected to a redundant network or a ring port or a port capable of being subjected to route switching at the time of failure and is set in advance to be excluded as a target of generation and control of a whitelist which is a list of communication data permitted to be transferred;

a second reception unit, within the packet relay device, that has a port connected to another device or an edge port or a port having no probability of occurrence of route switching at the time of failure and is set in advance as a target of generation and control of the whitelist;

a transfer unit, within the packet relay device, that transfers communication data to a transfer destination defined in advance when determining that the communication data has been received via the first reception unit, in a case where the communication device is set in advance to a whitelist generation state;

a control unit, within the packet relay device, that generates and stores the whitelist based on communication data that has been received and causes the transfer unit to transfer the communication data to a transfer destination defined in advance when the transfer unit determines that the communication data has been received via the second reception unit, in a case where the communication device is set in advance to the whitelist generation state; and a transfer setting memory in which one or a plurality of the first reception units is set in advance to perform regeneration and one or a plurality of the second reception units is set in advance not to perform regeneration, wherein the transfer setting memory further sets in advance the one or plurality of the first reception units as a target of generation and control of the whitelist and the control unit generates and stores a whitelist based on communication data received by the transfer unit via the one or plurality of the first reception units, and wherein when finding a failure on a redundant network, the control unit refers to the transfer setting memory, deletes a whitelist for the one or plurality of the first reception units, sets the communication device to a whitelist regeneration state, and regenerates the whitelist.

6. The communication device according to claim 5, wherein the transfer unit receives communication data and, in a case where the communication device is set to the regeneration state and it is determined with reference to the transfer setting memory that a reception unit that has received the communication data is the first reception unit, transmits header information on the communication data to the control unit, while the control unit regenerates the whitelist from the header information to store, and wherein, in a case where the communication device is not set to the regeneration state or in a case where it is determined with reference to the transfer setting memory that a reception unit that has received the communication data is the second reception unit, the transfer unit performs communication control on the communication data according to the whitelist.

7. The communication device according to claim 2, wherein the transfer unit includes:

a transfer destination resolution unit that controls transfer;

a transfer table memory in which transfer destination information is saved;

the whitelist retention memory; and the transfer setting memory, wherein the transfer setting memory further sets in advance a mode as to whether to use a whitelist function and sets in advance non-registration discard/pass, and wherein the transfer destination resolution unit:

refers to the transfer setting memory and controls whether communication control using the whitelist is to be carried out based on a setting of the mode; and refers to the transfer setting memory and controls whether data communication not registered in the whitelist is to be discarded or transferred based on a setting of the non-registration discard/pass.

8. The communication device according to claim 5, wherein, when finding a link down in a link connected to the first reception unit, the control unit changes the state of the first reception unit to a closed state so as not to change the state of the first reception unit even when finding a link up in the link connected to the first reception unit and, when accepting an opening instruction from the outside, changes the state of the first reception unit to an open state.

9. A communication method comprising:

setting in advance a first reception unit having a port connected to a redundant network or a ring port or a port capable of being subjected to route switching at the time of failure to be excluded from a target of generation and control of a whitelist which is a list of communication data permitted to be transferred;

setting in advance a second reception unit having a port connected to another device or an edge port or a port having no probability of occurrence of route switching at the time of failure as a target of generation and control of the whitelist;

transferring communication data to a transfer destination defined in advance when it is determined that the communication data has been received via the first reception unit, in a case where a communication device is set in advance to a whitelist generation state; and generating and storing the whitelist based on communication data that has been received and transferring the communication data to a transfer destination defined in advance when it is determined that the communication data has been received via the second reception unit, in a case where the communication device is set in advance to the whitelist generation state, wherein in a case where the communication device is set in advance to the whitelist generation state, the method further comprises:

determining whether a reception unit that has received communication data is the second reception unit that is the target of generation and control of the whitelist or the first reception unit excluded from the target;

transmitting header information on the communication data received by the second reception unit when determining that the second reception unit has received the communication data;

generating a whitelist according to the header information and store the whitelist to a whitelist retention memory; and transferring the communication data received via the second reception unit to a transfer destination defined in advance.

* * * * *